(12) United States Patent
Nakayama et al.

(10) Patent No.: US 11,684,976 B2
(45) Date of Patent: Jun. 27, 2023

(54) METHOD OF MANUFACTURING TRANSITION PIECE AND TRANSITION PIECE

(71) Applicant: Hitachi-GE Nuclear Energy, Ltd., Hitachi (JP)

(72) Inventors: Yukari Nakayama, Hitachi (JP); Sei Hirano, Hitachi (JP); Yoshihisa Kiyotoki, Hitachi (JP)

(73) Assignee: Hitachi-GE Nuclear Energy, Ltd., Hitachi (JP)

( * ) Notice: Subject to any disclaimer, the term of this patent is extended or adjusted under 35 U.S.C. 154(b) by 159 days.

(21) Appl. No.: 16/930,416

(22) Filed: Jul. 16, 2020

(65) Prior Publication Data

US 2021/0031264 A1 Feb. 4, 2021

(30) Foreign Application Priority Data

Jul. 29, 2019 (JP) .................................. 2019-139095

(51) Int. Cl.
*B22F 10/00* (2021.01)
*B33Y 10/00* (2015.01)
(Continued)

(52) U.S. Cl.
CPC .............. *B22F 10/00* (2021.01); *B22F 7/064* (2013.01); *B22F 7/08* (2013.01); *B23K 26/0006* (2013.01);
(Continued)

(58) Field of Classification Search
CPC ............................. B22F 2301/35; B22F 10/00
See application file for complete search history.

(56) References Cited

U.S. PATENT DOCUMENTS

| 4,869,645 A | * | 9/1989 | Verpoort | ................ | B22D 19/00 |
| | | | | | 148/555 |
| 5,112,146 A | * | 5/1992 | Stangeland | ............. | F16C 33/62 |
| | | | | | 384/492 |

(Continued)

FOREIGN PATENT DOCUMENTS

| CN | 105772723 A | * | 7/2016 |
| CN | 107774996 A | * | 3/2018 |

(Continued)

OTHER PUBLICATIONS

Japanese Office Action received in corresponding Japanese Application No. 2019-139095 dated Jun. 21, 2022.

*Primary Examiner* — Jacob J Cigna
(74) *Attorney, Agent, or Firm* — Mattingly & Malur, PC

(57) ABSTRACT

The invention provides a method of manufacturing a transition piece that has a high degree of freedom in adjustment of a length, a shape, or the like, can carry out a dissimilar metal welding easily, and is easy to perform, and a transition piece. The transition piece includes one end having the same composition as one material to be welded, another end having the same composition as another material to be welded, and an intermediate layer formed between the one end and the other end. The composition of the one end and the composition of the other end become the same as approaching a center. In the method of manufacturing the transition piece according to the invention, at least the intermediate layer among the one end, the other end, and the intermediate layer is formed by a additive manufacturing method.

8 Claims, 6 Drawing Sheets

(51) Int. Cl.
- *B23K 26/342* (2014.01)
- *B22F 7/06* (2006.01)
- *B23K 26/00* (2014.01)
- *B22F 7/08* (2006.01)
- *B33Y 80/00* (2015.01)
- *B22F 5/10* (2006.01)

(52) U.S. Cl.
CPC ............ *B23K 26/342* (2015.10); *B33Y 10/00* (2014.12); *B33Y 80/00* (2014.12); *B22F 5/106* (2013.01); *B22F 2301/35* (2013.01)

(56) References Cited

U.S. PATENT DOCUMENTS

| | | | | |
|---|---|---|---|---|
| 7,967,570 | B2 * | 6/2011 | Shi | F01D 5/147 416/223 R |
| 9,101,979 | B2 * | 8/2015 | Hofmann | C04B 35/64 |
| 2008/0237403 | A1 * | 10/2008 | Kelly | B22F 3/225 244/34 A |
| 2009/0028697 | A1 * | 1/2009 | Shi | F01D 5/147 415/200 |
| 2009/0269193 | A1 * | 10/2009 | Larose | B23K 20/1205 228/104 |
| 2011/0278490 | A1 | 11/2011 | Maruno et al. | |
| 2011/0311389 | A1 * | 12/2011 | Ryan | B22F 10/20 419/27 |
| 2012/0034101 | A1 * | 2/2012 | James | F01D 5/20 416/241 R |
| 2013/0071255 | A1 * | 3/2013 | Yokoyama | F01D 5/186 703/2 |
| 2015/0003995 | A1 * | 1/2015 | Xu | F01D 25/005 29/889.7 |
| 2015/0044084 | A1 * | 2/2015 | Hofmann | C21D 1/00 264/642 |
| 2015/0337664 | A1 * | 11/2015 | Cosi | F01D 5/141 416/232 |
| 2018/0161931 | A1 * | 6/2018 | Li | B23K 26/342 |
| 2019/0176273 | A1 * | 6/2019 | Srinivasan | B23P 6/007 |

FOREIGN PATENT DOCUMENTS

| | | | | | |
|---|---|---|---|---|---|
| CN | 111151880 | A | * | 5/2020 | |
| CN | 110303154 | B | * | 7/2021 | ............ B22F 1/0003 |
| DE | 102019219133 | A1 | * | 6/2021 | |
| JP | 61-95802 | A | | 5/1986 | |
| JP | 4-341508 | A | | 11/1992 | |
| JP | 2011-214682 | A | | 10/2011 | |
| JP | 2015-183288 | A | | 10/2015 | |
| WO | WO-2021182050 | A1 | * | 9/2021 | |

* cited by examiner

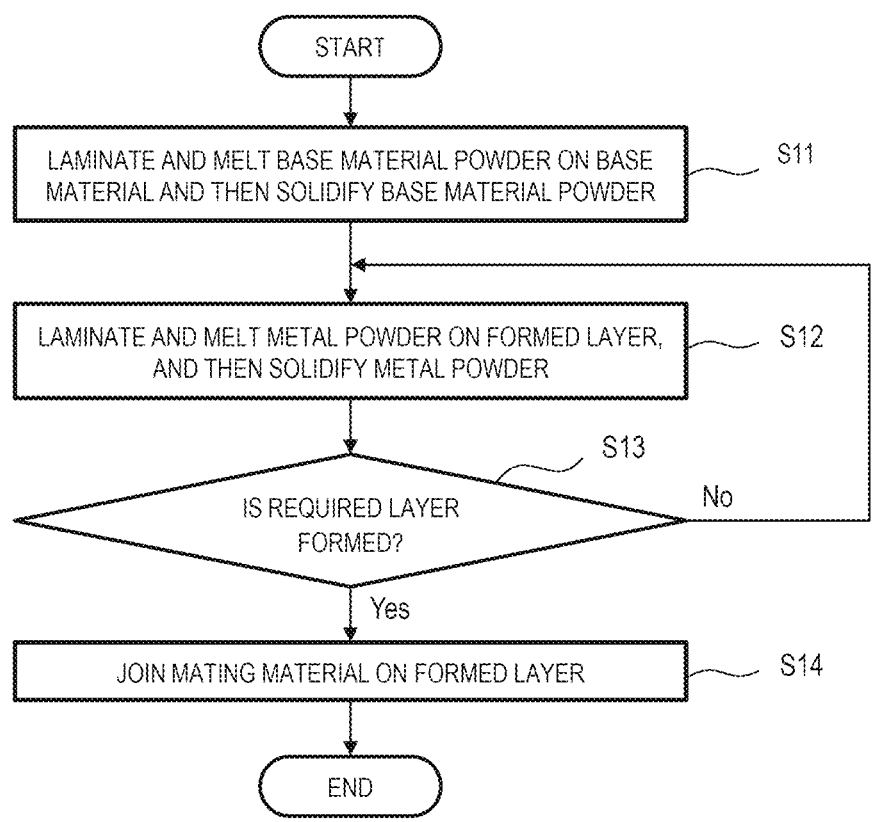

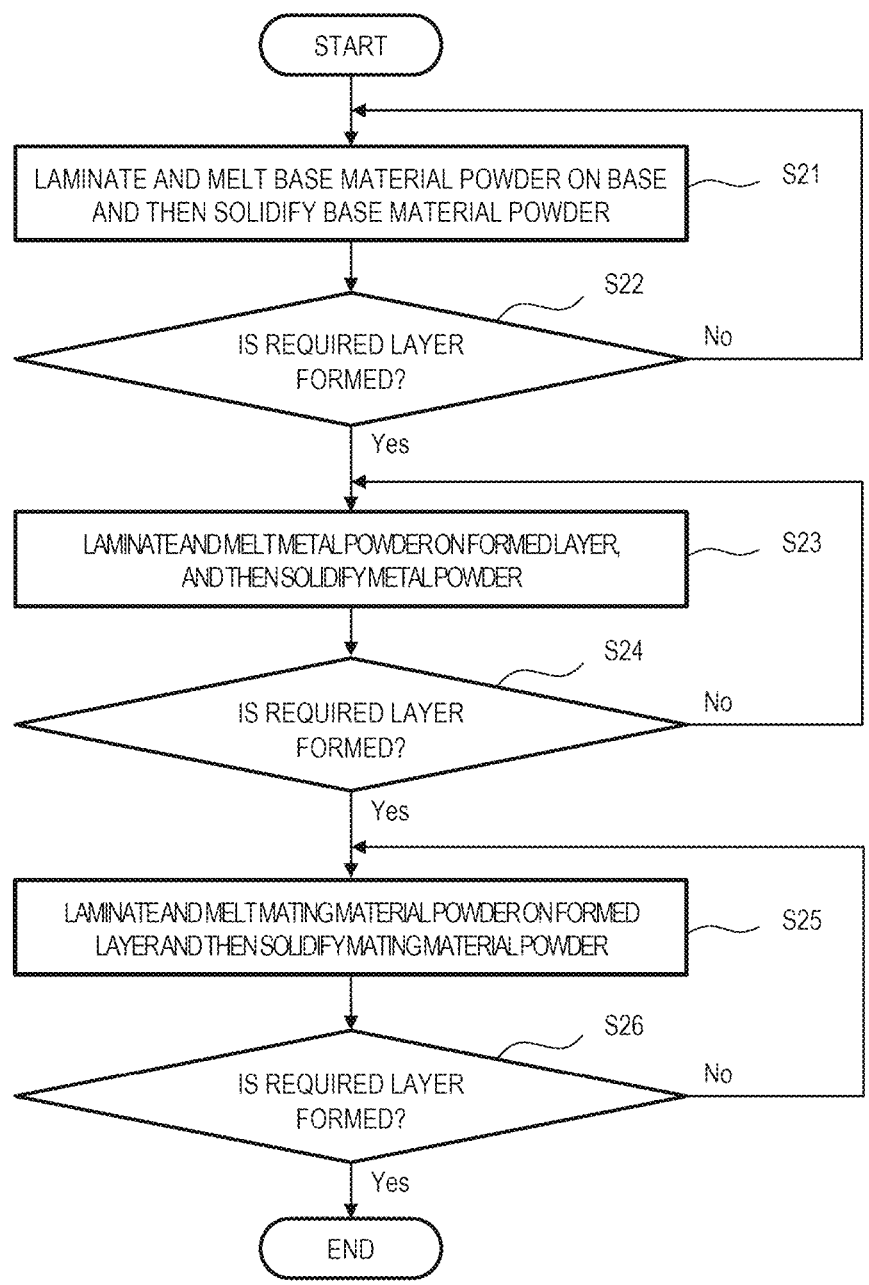

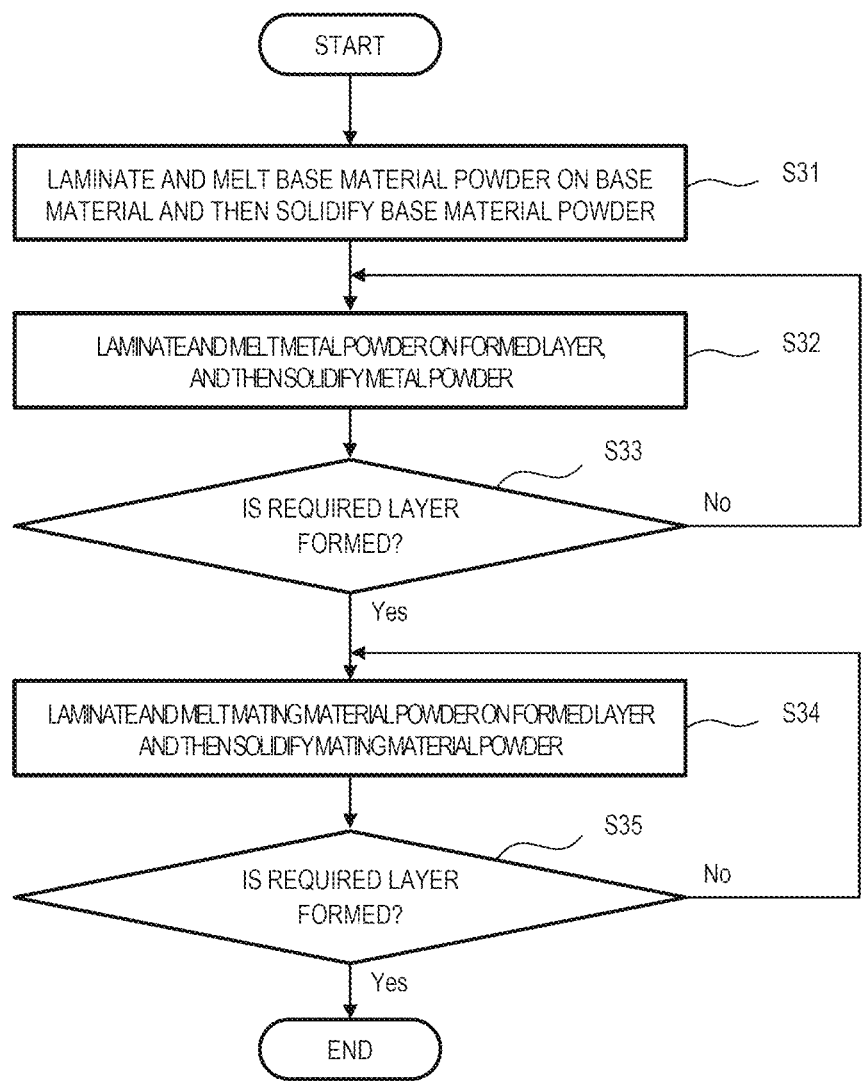

METHOD OF MANUFACTURING TRANSITION PIECE AND TRANSITION PIECE

CROSS-REFERENCE TO RELATED APPLICATION

The present application claims priority from Japanese application JP 2019-139095, filed on Jul. 29, 2019, the contents of which is hereby incorporated by reference into this application.

BACKGROUND OF THE INVENTION

1. Field of the Invention

The present invention relates to a method of manufacturing a transition piece and a transition piece.

2. Description of the Related Art

In a nuclear power plant or a thermal power plant, for example, pipes made of dissimilar metals such as a carbon steel and an alloy steel may be connected by welding. This welding is called dissimilar metal welding and is an important technique in plant engineering.

However, when the dissimilar metal welding is performed, a compound phase containing various compounds such as a carbide or a boride is formed when metals are cooled from a molten state to a solid state. Since the compound phase is selectively corroded and eroded by such as a contacting fluid, frequent inspection and repair work is required. In addition, in the dissimilar metal welding, the welded metals are diluted by a penetration of a base material and an alloy composition changes. It is found that components of the carbon steel or the alloy steel are diluted with this change, and as a result a crack in an austenitic welded metal or a component transition layer at a weld boundary of carbon steel side generates for example (the generated component transition layer also causes a crack). In order to resolve with these problems when performing the dissimilar metal welding, it is effective to dilute at a small degree and uniform, and it is required to perform the welding at a low current and a low speed.

In addition, JP-A-2011-214682 proposes a technique for dealing with these problems caused by the dissimilar metal welding, for example, the corrosion. JP-A-2011-214682 relates to a valve including a valve seat (a component of a slide or contact portion) which is used in the nuclear power plant, the thermal power plant, or the like, and describes the following content.

Specifically, JP-A-2011-214682 describes a valve including a valve body, a valvedisc, and valve seats on corresponding sliding surfaces of the valve body and the valvedisc, in which both of the valve seats are made of at least one material selected from a Co-based, an Ni-based and a Fe-based alloy, and a surface layer of the valve seat is formed by a base portion made of a cubic and an alloy to which a granular or blocky eutectic chemical compound having a grain diameter equal to or less than 100 μm is dispersed. Then, JP-A-2011-214682 describes that the valve seats bonded to the valve body and the valve dis care formed by a surface hard facing material, and are formed by carrying out a friction stir processing on surfaces of the valve seats and cooling the surface hard facing material after melting or half melting.

In the valve described in JP-A-2011-214682, a metal structure of the surface layer of the valve seat comes to a cubic by applying the friction stir processing to the surface hard facing material, and the compound phase such as an eutectic carbide or the like crystallizing in a base material gap is also simultaneously dispersed in a granular shape or a blocky shape. Therefore, the valve described in JP-A-2011-214682 has advantage of an impact resistance and a maintenance performance, preventing a continuous progress of a selective and continuous corrosion damage and an erosion damage of the compound phase such as the eutectic carbide, and preventing a reduction of a leakage resistance caused by increasing of a friction resistance in a sliding portion of the valve or a roughness of the surface of the valve seat or the like.

When trying to apply the technique described in JP-A-2011-214682 to the dissimilar metal welding in the nuclear power plant, the thermal power plant, or the like, it is necessary to carry out the dissimilar metal welding after applying a friction stir processing on the surface hard facing material. Accordingly, the dissimilar metal welding may not be easily carried out. When considering to carry out the dissimilar metal welding easily, it is conceivable to dispose and weld a transition piece between one material to be welded and another material to be welded made of the dissimilar metals. The transition piece includes one end having the same composition as the one material to be welded, another end having the same composition as the other material to be welded, and an intermediate layer including a plurality of layers in which a composition is changed stepwise between the one end and the other end. It should be noted the transition piece is also called a buttering piece.

However, when such a transition piece is used, it is required to perform a penetration testing for confirming a presence or an absence of a crack or the like every time a layer having a different composition is formed, which makes it difficult to apply the transition piece.

In addition, since a welding rod is used for welding in the dissimilar metal welding, there are restrictions on a diameter, a thickness, a length or a shape of the transition piece. Therefore, for example, when a space between the one material to be welded and the other material to be welded is narrow or the like, depending on an installation environment of the materials to be welded in which the dissimilar metal welding is carried out, it is necessary to cut a side of a material to be welded so that the transition piece can be used.

SUMMARY OF THE INVENTION

The invention is made in view of the above circumstances and an object of the invention is to provide a method of manufacturing a transition piece that has a high degree of freedom in adjustment of a length, a shape, or the like, which can carry out a dissimilar metal welding easily, and is easy to perform, and a transition piece.

As a result of intensive researches and development to solve the above problems, the present inventors found that, by utilizing characteristics of laser additive manufacturing method and changing a heat input and a composition during formation of an intermediate layer, not only a penetration amount and a metal composition after welding are controlled stably, but also that a transition piece having different diameters, thicknesses, and groove shapes at both edge of the piece can be manufactured, and the invention was completed.

In a method of manufacturing a transition piece according to the invention solving the above problems, the transition piece includes: one end having the same composition as one material to be welded; another end having the same composition as another material to be welded; and an intermediate layer formed between the one end and the other end, the composition of the one end and the composition of the other end becoming the same as approaching a center, and at least the intermediate layer among the one end, the other end, and the intermediate layer is formed by a additive manufacturing method.

According to the invention, a method of manufacturing a transition piece that has a high degree of freedom in adjustment of a length, a shape, or the like, can carry out a dissimilar metal welding easily and is easy to perform, and a transition piece are provided.

BRIEF DESCRIPTION OF THE DRAWINGS

FIG. 3A is a flowchart of manufacturing a transition piece by the LMD according to an embodiment.

FIG. 3B is a flowchart of manufacturing a transition piece by the LMD according to another embodiment.

FIG. 3C is a flowchart of manufacturing a transition piece by the LMD according to another embodiment.

DESCRIPTION OF THE PREFERRED EMBODIMENTS

Figure 1:
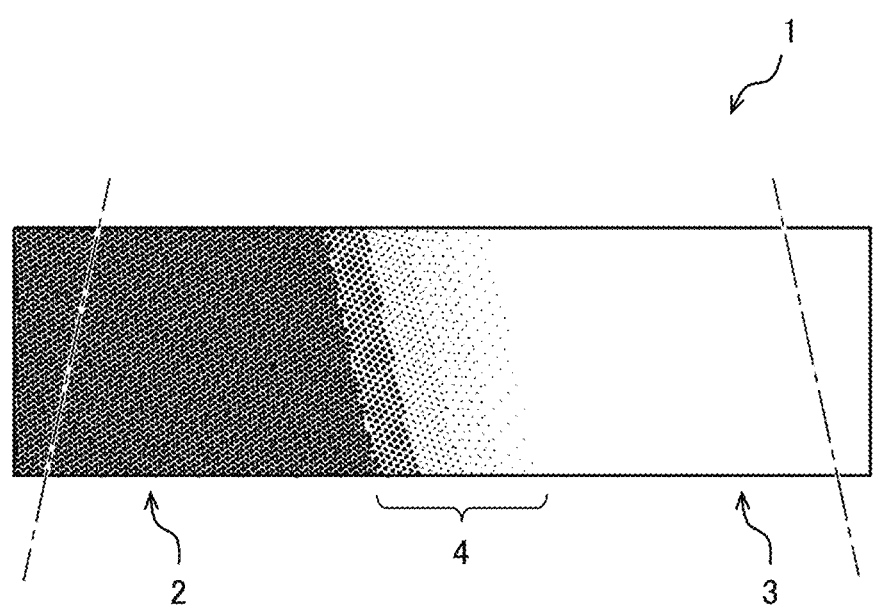
FIG. 1 is a schematic diagram illustrating a configuration example of a transition piece to be manufactured by the present manufacturing method.

Hereinafter, embodiments of the invention will be described with reference to the drawings. The drawings referred to in the following descriptions schematically show the embodiments and accordingly, a scale, an interval, a positional relationship, or the like of members may be exaggerated, deformed, or illustration of a part of the members may be omitted. In addition, in the schematic diagrams, scales or intervals of the members may not match. The following descriptions show specific examples of contents of the invention, the invention is not limited to the descriptions, and various changes and modifications can be made by those skilled in the art within the scope of the technical idea disclosed in the description. In addition, in all the drawings for describing the invention, those having the same functions are denoted by the same reference numerals, and repeated descriptions thereof may be omitted.

The expression "to" described in the description is used with a meaning to include numerical values described therebefore and thereafter as a lower limit value and an upper limit value. In numerical ranges described stepwise in the description, a lower limit value or an upper limit value described in one numerical range may be replaced with a lower limit value or another upper limit value described in another step.

Method of Manufacturing Transition Piece

First, a method of manufacturing a transition piece according to the present embodiment (hereinafter, also referred to as "the present manufacturing method") will be described. The transition piece manufactured in the present embodiment is disposed between one material to be welded and another material to be welded when carrying out a dissimilar metal welding. The transition piece is used for welding one end of the transition piece to the one material to be welded, welding another end of the transition piece to the other material to be welded, and integrating the one material to be welded and the other material to be welded.

Here, a configuration of the transition piece to be manufactured by the present manufacturing method will be briefly described. FIG. 1 is a schematic diagram illustrating a configuration example of a transition piece 1 to be manufactured by the present manufacturing method.

As shown in FIG. 1, the transition piece 1 includes one end 2 (also referred to as a "base material" in the present description) having the same composition as the one material to be welded. The transition piece 1 further includes another end 3 (also referred to as a "mating material" in the present description) having the same composition as the other material to be welded. The transition piece 1 further includes an intermediate layer 4 formed between the one end 2 and the other end 3 in which the composition of the one end 2 and the composition of the other end 3 become the same as approaching a center. In the present manufacturing method, at least the intermediate layer 4 among the one end 2, the other end 3, and the intermediate layer 4 is formed by a additive manufacturing method.

As described above, since the one end 2 and the other end 3 have the same compositions as corresponding materials to be welded, a crack caused by welding the materials can hardly occur. In addition, since the intermediate layer 4 is formed, a compound phase containing various compounds such as a carbide or a boride is hardly formed even when carrying out the dissimilar metal welding. Therefore, a corrosion, a crack, or the like hardly occur.

Here, the additive manufacturing method refers to a method of forming a shaped article having an arbitrary shape using a 3D printer. In the additive manufacturing method using metal powder, there is a powder bed (PB) method and a powder deposition (PD) method as a powder supply method and both of these can be used in the present embodiment. In addition, in the additive manufacturing method using the metal powder, there is a method using a laser beam as a melting light source and a method using an electron beam as the melting light source and both of these can be used in the present embodiment. For example, in the PB method, the metal powder is spread by a material supply roller and is melted and sintered by irradiating the laser beam or the electron beam. Thereafter, a stage is lowered and the same process is repeated while arbitrarily changing a composition of the metal powder, thereby manufacturing a molded body (the transition piece 1) embedded in the metal powder. In addition, for example, in the PD method, while the metal powder is supplied from a nozzle (in this case, the composition of the metal powder is arbitrarily changed), the metal powder is irradiated with the laser beam and is melted and sintered to manufacture a molded body (the transition piece 1). Any type of 3D printer can be used as long as the 3D printer can carry out lamination molding using the metal powder. Additive manufacturing methods that can be used in the present embodiment preferably include a selective laser melting method (SLM) as an example of the PB method and a laser metal deposition method (LMD) as an example of the PD method and are not limited thereto. In any of the additive manufacturing methods, at least the intermediate layer 4 can be formed as described above (the one end 2 and the other end 3 can also be formed if desired).

Figure 2A:
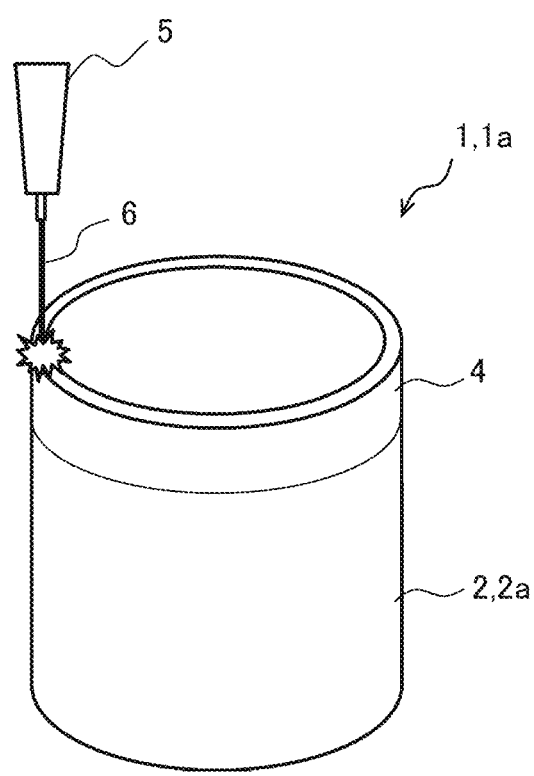
FIG. 2A is a schematic diagram illustrating a state in which a transition piece that is a hollow material is manufactured by a laser metal deposition method (LMD) as a additive manufacturing method.
Figure 2B:
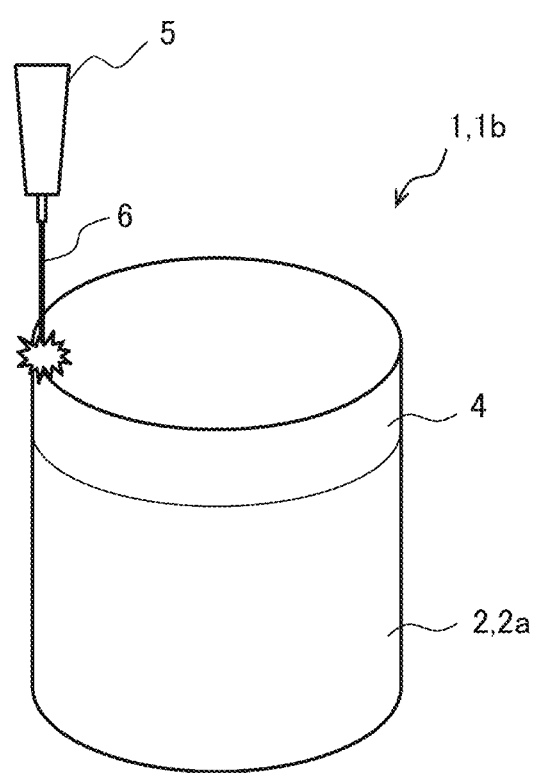
FIG. 2B is a schematic diagram illustrating a state in which a transition piece that is a solid material is manufactured by the LMD as the additive manufacturing method.

Here, an embodiment will be described in which the transition piece 1 is manufactured by applying the LMD as the additive manufacturing method. In the drawings to be referred to, FIG. 2A is a schematic diagram illustrating a state in which a transition piece 1a that is a hollow material is manufactured by applying the LMD as the additive manufacturing method. FIG. 2B is a schematic diagram illustrating a state in which a transition piece 1b that is a solid material is manufactured by applying the LMD as the additive manufacturing method. FIGS. 2A and 2B both show a state in which a first piece material 2a is used as the base material and at least the intermediate layer 4 is formed on the first piece material 2a. Then, FIG. 3A is a flowchart of manufacturing the transition piece 1 by the LMD according to an embodiment. FIG. 3B is a flowchart of manufacturing the transition piece 1 by the LMD according to another embodiment. FIG. 3C is a flowchart of manufacturing the transition piece 1 by the LMD according to another embodiment. In the present description, the hollow material refers to a tubular member including a cavity in which the one end 2 and the other end 3 communicate with each other, and the solid material refers to a member including no cavity therein.

As shown in FIGS. 2A and 2B, while the metal powder is supplied from a nozzle 5 to the base material (the first piece material 2a) (in this case, the composition of the metal powder is arbitrarily changed), a laser beam 6 is radiated on the metal powder to melt and sinter the metal powder. In this way, at least the intermediate layer 4 is formed and molded bodies (transition pieces 1, 1a, 1b) are manufactured. The intermediate layer 4 is formed only on a spot on the base material where the metal powder is discharged from the nozzle 5 and the laser beam 6 is radiated. Therefore, when forming the intermediate layer 4 in an area wider than the spot of the laser beam 6, the powder discharged from the nozzle 5 is melted by the laser light 6 and deposited while moving the nozzle 5 and the spot of the laser light 6 so as to cover the entire area. A thickness of the formed intermediate layer 4 can be adjusted by controlling an amount of the metal powder discharged from the nozzle 5, a moving speed of the nozzle 5, or the like. A temperature of the metal powder at a time of melting and solidifying can be adjusted by controlling an intensity of the laser beam 6 or the like.

In manufacturing of the transition pieces 1a, 1b shown in FIGS. 2A and 2B, for example, the first piece material 2a having the same composition as the one material to be welded is used as the one end 2 and a second piece material (not shown) having the same composition as the other material to be welded is used as the other end 3. Then, the intermediate layer 4 is formed on the first piece material 2a by the additive manufacturing method and the second piece material is joined on the formed intermediate layer 4. It is preferable that the first piece material 2a and the second piece material are prepared in advance in arbitrary shapes.

In this embodiment, for example, as shown in FIG. 3A, the metal powder (base material powder) having the same composition as the base material is laminated on the base material (the one end 2, the first piece material 2a) serving as a base, and is simultaneously irradiated with the laser beam 6 and is melted and then solidified to form a layer (step S11).

Next, the metal powder is laminated on the layer formed in step S11, and is simultaneously irradiated with the laser beam 6 and is melted and then solidified to form a layer (the intermediate layer 4) (step S12). When laminating the metal powder, the composition of the metal powder can be arbitrarily changed. In this embodiment, the composition of the metal powder is changed continuously (linearly) or stepwise to become the composition of the other end 3.

Then, it is determined whether or not a required layer is formed. When the layer is not formed ("NO" in step S13), the process returns to step S12 to continue layer formation. On the other hand, when the layer is formed ("YES" in step S13), the process proceeds to step S14. The determination as to whether or not the required layer is formed includes, for example, deriving and confirming from a mixing ratio or the like whether or not a composition of the formed layer reaches a preset set value.

Then, in step S14, the mating material (the other end 3 (the second piece material)) is joined on the layer formed in step S12. The joining in step S14 is preferably carried out by welding.

As another embodiment, in the present manufacturing method, for example, all of the one end 2, the intermediate layer 4, and the other end 3 can be formed by the additive manufacturing method in this order.

In a case of this embodiment, for example, as shown in FIG. 3B, base material powder is laminated on a base and is simultaneously irradiated with the laser beam 6 and is melted and then solidified to form a layer (step S21). In step S21, only the base material powder is laminated and the one end 2 described above is formed.

Next, it is determined whether or not a required layer is formed. When the layer is not formed ("NO" in step S22), the process returns to step S21 to continue layer formation. On the other hand, when the layer is formed ("YES" in step S22), the process proceeds to step S23. The determination as to whether or not the required layer is formed includes, for example, confirming whether or not a dimension of the formed layer or time required for the formation reaches a preset set value.

Then, in step S23, metal powder is laminated on the layer (a layer of the base material) formed in step S21 and is simultaneously irradiated with the laser beam 6 and is melted and then solidified to form a layer (the intermediate layer 4). When laminating the metal powder on the layer of the base material serving as the base, the composition of the metal powder can be arbitrarily changed. In this embodiment, the composition of the metal powder is changed continuously (linearly) or stepwise to become the composition of the other end 3.

Then, it is determined whether or not a required layer can be formed. When the layer is not formed ("NO" in step S24), the process returns to step S23 to continue layer formation. On the other hand, when the layer is formed ("YES" in step S24), the process proceeds to step S25. The determination as to whether or not the required layer is formed includes, for example, deriving and confirming from a mixing ratio or the like whether or not the composition of the formed layer reaches a preset set value.

Then, in step S25, powder (a mating material powder) for forming a mating material (the other end 3) is laminated on the layer formed in step S23 and is simultaneously irradiated with the laser beam 6 and is melted and then solidified to form a layer (a layer of the mating material, the other end 3). In step S25, only the mating material powder is laminated and the other end 3 described above is formed.

Next, it is determined whether or not a required layer is formed. When the layer is not formed ("NO" in step S26), the process returns to step S25 to continue layer formation. On the other hand, when the layer is formed ("YES" in step S26), the manufacturing process ends. The determination as to whether or not the required layer is formed includes, for example, confirming whether or not the dimension of the formed layer or time required for the formation reaches a preset set value.

Further, as another embodiment, in the present manufacturing method, for example, the first piece material 2a having the same composition as the one material to be welded is used as the one end 2, and the intermediate layer 4 and the other end 3 are formed in this order on the first piece material 2a by the additive manufacturing method.

In the case of this embodiment, for example, as shown in FIG. 3C, a base material powder is laminated on a base material (the one end 2, the first piece material 2a) serving as a base and is simultaneously irradiated with the laser beam 6 and is melted and then solidified to form a layer (step S31).

Next, metal powder is laminated on the layer formed in step S31 and is simultaneously irradiated with the laser beam 6 and is melted and then solidified to form a layer (the intermediate layer 4) (step S32). When laminating the metal powder, the composition of the metal powder can be arbitrarily changed. In this embodiment, the composition of the metal powder is changed continuously (linearly) or stepwise to become the composition of the other end 3.

Then, it is determined whether or not a required layer is formed. When the layer is not formed ("NO" in step S33), the process returns to step S32 to continue layer formation. On the other hand, when the layer is formed ("YES" in step S33), the process proceeds to step S34. The determination as to whether or not the required layer is formed includes, for example, deriving and confirming from a mixing ratio or the like whether or not the composition of the formed layer reaches a preset set value.

Then, in step S34, powder (the mating material powder) for forming a mating material (the other end 3) is laminated on the layer formed in step S32 and is simultaneously irradiated with the laser beam 6 and is melted and then solidified to form a layer (the layer of the mating material (the other end 3)). In step S34, only the mating material powder is laminated and the other end 3 described above is formed.

Next, it is determined whether or not a required layer is formed. When the layer is not formed ("NO" in step S35), the process returns to step S34 to continue layer formation. On the other hand, when the layer is formed ("YES" in step S35), the manufacturing process ends. The determination as to whether or not the required layer is formed includes, for example, confirming whether or not the dimension of the formed layer or time required for the formation reaches a preset set value.

In the embodiment shown in FIG. 3C, the second piece material is used instead of the first piece material 2a, and the intermediate layer 4 and the one end 2 can be formed in this order on the second piece material by the additive manufacturing method.

Here, in the present embodiment, it is preferable that the composition of the intermediate layer 4 described above continuously (linearly) changes from the one end 2 to the other end 3, or changes stepwise from the one end 2 to the other end 3, and that the intermediate layer 4 includes at least four layers having different compositions. In this way, when a metallurgical change from a carbon steel/a stainless steel or an alloy steel/a stainless steel to the stainless steel/the stainless steel occurs due to the dissimilar metal welding, such a metallurgical change is gentler as the number of the layers increases (more preferably, the composition continuously changes). Accordingly, the invention can be applied to a place under a severe use condition. For example, when the intermediate layer 4 is formed by laminating four layers having different compositions, in an order from the one end 2 (the base material 100%), a composition of a first layer can be the base material 80%: the mating material 20%, a composition of a second layer can be the base material 60%: the mating material 40%, a composition of a third layer can be the base material 40%: the mating material 60%, and a composition of a fourth layer can be the base material 20%: the mating material 80%. The intermediate layer 4 can also include only one layer depending on a low-grade product or a use requirement.

In the present embodiment, for example, it is preferable that the one end 2 in the transition piece 1 has the same composition as the stainless steel and the other end 3 has the same composition as the carbon steel or the alloy steel. In this way, it is possible to appropriately cope with the dissimilar metal welding most frequently used in a nuclear power plant, a thermal power plant, or the like.

Then, in the present embodiment, it is preferable that the composition the same as the alloy steel is a composition of a cast steel product for high temperature and pressure specified in Japanese Industrial Standard, hereafter called JIS, a composition of an alloy steel pipe for piping, a composition of an alloy steel material for a machine structure, a composition of an alloy steel forging for a high temperature pressure vessel, a composition of an Ni-based and Fe-based alloy, or a composition of an alloy obtained by adding at least one of Mo, W, Nb, V, Cr, and Ta to any one of the above compositions. In this way, it is possible to more appropriately cope with the dissimilar metal welding most frequently used in the nuclear power plant, the thermal power plant, or the like.

In the present embodiment, it is preferable that when the transition piece 1 is the hollow material, at least one of a diameter of 700 mm (DN 700) or less, an outer diameter of 711.2 mm or less, and a tube thickness of 64.2 mm (Schedule 160) or less is satisfied. In this way, it is possible to further appropriately cope with the dissimilar metal welding most frequently used in the nuclear power plant, the thermal power plant, or the like.

In the present embodiment, it is preferable that the joining of the intermediate layer 4 and the second piece material (the other end) is performed under conditions of a laser output of 1000 W to 2000 W and a powder supply amount of 0.05 g/min to 0.5 g/min. The intensity of the laser beam 6 or the supply amount of the metal powder when joining the intermediate layer 4 and the second piece material largely depends on the composition of the metal powder. In order to prevent a high-temperature crack or a low-temperature crack during the welding, it is preferable that welded metals formed during the joining have a composition (a metal structure) containing a small amount of ferrite in austenite. When the intermediate layer and the second piece material are joined under the above conditions as in the present embodiment, the welded metals formed during the joining tend to have the composition containing a small amount of ferrite in the austenite.

The additive manufacturing method generally has a high degree of freedom in a shape of the molded body and can form a complicated shape. In addition, as described above, when the first piece material 2a and the second piece material are formed in arbitrary shapes in advance, it is acceptable as long as only the intermediate layer 4 is formed by the additive manufacturing method. Therefore, the transition piece 1 manufactured by applying the additive manufacturing method can be used as it is for the dissimilar metal welding. However, for at least one of the one end 2 and the other end 3 of the transition piece 1 manufactured in this way, at least one of a diameter, a thickness, and a groove shape can be adjusted as necessary. In this way, the dissimilar metal welding can be carried out more appropriately.

As described above, when manufacturing the transition piece 1 in the present embodiment, at least the intermediate layer 4 is formed by the additive manufacturing method. Accordingly, not only a length, a shape or the like can be arbitrarily adjusted with the high degree of freedom but also the manufacturing is easy. In addition, since the mixing ratio between the base material powder and the mating material powder can be freely adjusted, when the intermediate layer 4 is provided stepwise, the number of laminating layers or a dimension per layer can also be freely adjusted. Further, characteristics of the additive manufacturing method can be utilized and the intermediate layer 4 can be formed with a fine stepwise composition. Therefore, a composition change is gentler and selectivity of the composition can be expanded. As a result, by using the transition piece 1 manufactured by the present manufacturing method, the dissimilar metal welding can be carried out without depending on an ability of an operator, an operation can be simplified, and burden can also be reduced.

Transition Piece 1

Next, the transition piece 1 according to the present embodiment will be described in detail. The transition piece 1 can be properly manufactured by the present manufacturing method described above. A description of components already described in detail for the transition piece 1 may be omitted.

As described above with reference to FIG. 1, the transition piece 1 includes the one end 2 having the same composition as the one material to be welded and the other end 3 having the same composition as the other material to be welded. The transition piece 1 further includes the intermediate layer 4 formed between the one end 2 described above and the other end 3 described above. The intermediate layer 4 is formed such that the composition of the one end 2 and the composition of the other end 3 become the same as approaching the center. Then, the composition of the intermediate layer 4 changes continuously from the one end 2 described above to the other end 3 described above, or changes stepwise from the one end 2 described above to the other end 3 described above. The intermediate layer 4 includes at least four layers having different compositions.

In the transition piece 1 according to the present embodiment, it is preferable that the one end 2 has the same composition as the stainless steel and the other end 3 has the same composition as the carbon steel or the alloy steel. In addition, in the transition piece 1 according to the present embodiment, it is preferable that the composition the same as the alloy steel is the composition of a cast steel product for high temperature and pressure specified in JIS, the composition of an alloy steel pipe for piping, the composition of an alloy steel material for a machine structure, the composition of an alloy steel forging for a high temperature pressure vessel, the composition of a Ni-based and Fe-based alloy, or the composition of an alloy obtained by adding at least one of Mo, W, Nb, V, Cr, and Ta to any one of the above compositions. Further, it is preferable that the transition piece 1 according to the present embodiment is a hollow material and satisfies at least one of the diameter of 700 mm (DN 700) or less, the outer diameter of 711.2 mm or less, and the wall thickness of 64.2 mm (Schedule 160) or less.

As described above, the method of manufacturing a transition piece and the transition piece according to the invention are described in detail with reference to the embodiments, but the gist of the invention is not limited to this and includes various modifications. For example, the embodiments described above are described in detail for easy understanding of the invention, and the invention is not necessarily limited to the embodiment including all the configurations described above. In addition, a part of the configuration of one embodiment can be replaced with the configuration of another embodiment, and the configuration of another embodiment can be added to the configuration of one embodiment. In addition, a part of the configuration of each embodiment can be added to, deleted from, or replaced with another configuration.

What is claimed is:

1. A method of manufacturing a transition piece, comprising:
    laminating a base material powder on a base and simultaneously irradiating the base material powder with a laser beam to form a layer of one end having the same composition as one material to be welded;
    determining whether a dimension of the formed layer of the one end or time required for the formation reaches a preset set value;
    upon determining the dimension of the formed layer of the one end or the time required for formation does not reach a preset set value, forming another layer on the layer of the one end with the base material powder;
    upon determining the dimension of the formed layer of the one end or the time required for formation reaches a preset set value, laminating a metal powder on the one end and simultaneously irradiating the metal powder with the laser beam to form a layer of an intermediate layer;
    determining whether a composition of the layer of the intermediate layer meets a predetermined value;
    upon determining the composition of the layer of the intermediate layer does not meet the predetermined value, forming another layer on the layer of the intermediate layer using the metal powder;
    upon determining the composition of the intermediate layer meets the predetermined value, laminating a mating material powder on the intermediate layer and simultaneously irradiating the mating material powder with the laser beam form a layer of another end; and
    determining whether a dimension of the formed layer of the another end or time required for the formation reaches a preset set value,
    wherein the another end has the same composition as another material to be welded,
    wherein the composition of the one end and the composition of the another end becomes the same as approaching a center of the intermediate layer,
    wherein at least the intermediate layer among the one end, the other end, and the intermediate layer is formed by an additive manufacturing method, and
    wherein a first piece material having the same composition is used as the one material to be welded as the one end, a second piece material having the same composition is used as the other material to be welded as the another end.

2. The method of manufacturing the transition piece according to claim 1, wherein each of the one end, the intermediate layer, and the another end is formed by the additive manufacturing method in this order.

3. The method of manufacturing the transition piece according to claim 1,
wherein the composition of the intermediate layer changes continuously from the one end to the another end, or changes stepwise from the one end to the another end, and the intermediate layer includes at least four layers having different compositions.

4. The method of manufacturing the transition piece according to claim 1,
wherein the transition piece is a hollow material and satisfies at least one of a diameter of 700 mm or less, an outer diameter of 711.2 mm or less, and a pipe thickness of 64.2 mm or less.

5. The method of manufacturing the transition piece according to claim 1,
wherein the joining of the intermediate layer and the second piece material is carried out under conditions of a laser output of 1000 W to 2000 W and a powder supply amount of 0.05 g/min to 0.5 g/min.

6. The method of manufacturing the transition piece according to claim 1,
wherein for at least one of the one end and the another end of the manufactured transition piece, at least one of a diameter, a thickness, and a groove shape is adjusted.

7. The method of manufacturing the transition piece according to claim 1,
wherein the one end has the same composition as a stainless steel and the another end has the same composition as a carbon steel or an alloy steel.

8. The method of manufacturing the transition piece according to claim 7,
wherein the composition the same as the alloy steel is a composition of steel casting for high temperature and pressure service, a composition of an alloy steel pipe for piping, a composition of an alloy steel material for a machine structural use, or a composition of an alloy steel forging for a high temperature pressure vessel.

* * * * *